US009850822B2

(12) United States Patent
Kupratis

(10) Patent No.: US 9,850,822 B2
(45) Date of Patent: *Dec. 26, 2017

(54) SHROUDLESS ADAPTIVE FAN WITH FREE TURBINE

(71) Applicant: United Technologies Corporation, Hartford, CT (US)

(72) Inventor: Daniel Bernard Kupratis, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 1078 days.

This patent is subject to a terminal disclaimer.

(21) Appl. No.: 14/207,970

(22) Filed: Mar. 13, 2014

(65) Prior Publication Data
US 2016/0376998 A1    Dec. 29, 2016

Related U.S. Application Data

(60) Provisional application No. 61/788,278, filed on Mar. 15, 2013.

(51) Int. Cl.
*F02C 9/22* (2006.01)
*F02K 3/077* (2006.01)
*F02C 9/20* (2006.01)
*F02K 3/06* (2006.01)
*F02C 3/10* (2006.01)

(52) U.S. Cl.
CPC .................. *F02C 9/22* (2013.01); *F02C 3/10* (2013.01); *F02C 9/20* (2013.01); *F02K 3/06* (2013.01); *F02K 3/077* (2013.01)

(58) Field of Classification Search
CPC ...... F02C 9/18; F02C 9/22; F02C 9/20; F02C 9/16; F02C 3/10; F02K 3/00; F02K 3/06; F02K 3/065; F02K 3/075; F02K 3/077; F02K 3/02; F02K 3/025; F02K 3/04; F05B 2250/411
See application file for complete search history.

(56) References Cited

U.S. PATENT DOCUMENTS 3,486,328 A  *  12/1969  Serge .................. F02C 7/04
                                                  415/79
4,043,121 A      8/1977  Thomas et al.
4,064,692 A     12/1977  Johnson et al.
(Continued)

FOREIGN PATENT DOCUMENTS

WO     2011/162845 A1    12/2011

*Primary Examiner* — Gerald L Sung
*Assistant Examiner* — Alain Chau
(74) *Attorney, Agent, or Firm* — Carlson, Gaskey & Olds, P.C.

(57) ABSTRACT

A disclosed gas turbine engine includes a first fan section including a plurality of fan blades rotatable about an axis, a compressor in fluid communication with the first fan section, a combustor in fluid communication with the compressor and a first turbine section in fluid communication with the combustor. The first turbine section includes a low pressure turbine that drives the first fan section. A second fan section is supported between the first fan section and the compressor and is driven by a second turbine section disposed between the second fan section and the compressor for driving the second fan section.

15 Claims, 3 Drawing Sheets

(56) References Cited

U.S. PATENT DOCUMENTS

| | | | | |
|---|---|---|---|---|
| 4,080,785 A | * | 3/1978 | Koff | F02K 3/077 415/69 |
| 4,376,375 A | | 3/1983 | Boudigues | |
| 5,794,432 A | | 8/1998 | Dunbar et al. | |
| 5,816,042 A | | 10/1998 | Guinan et al. | |
| 5,871,333 A | * | 2/1999 | Halsey | F01D 11/22 415/173.1 |
| 6,102,329 A | | 8/2000 | Guinan et al. | |
| 6,209,311 B1 | * | 4/2001 | Itoh | F02C 3/13 60/226.3 |
| 7,926,290 B2 | | 4/2011 | Johnson et al. | |
| 8,104,265 B2 | | 1/2012 | Kupratis | |
| 8,127,528 B2 | | 3/2012 | Roberge | |
| 8,209,952 B2 | | 7/2012 | Ress, Jr. | |
| 8,935,923 B2 | * | 1/2015 | Kupratis | F02C 7/143 60/226.1 |
| 9,057,328 B2 | * | 6/2015 | Kupratis | F02C 7/143 |
| 9,140,188 B2 | * | 9/2015 | Kupratis | F02C 7/143 |
| 9,157,366 B2 | * | 10/2015 | Kupratis | F02C 3/06 |
| 9,239,004 B2 | * | 1/2016 | Kupratis | F02C 6/02 |
| 2004/0060279 A1 | | 4/2004 | Joseph et al. | |
| 2005/0024129 A1 | | 2/2005 | Jang | |
| 2007/0119150 A1 | | 5/2007 | Wood et al. | |
| 2009/0000271 A1 | * | 1/2009 | Kupratis | F02K 3/077 60/224 |
| 2010/0031669 A1 | | 2/2010 | Ensign | |
| 2010/0223902 A1 | | 9/2010 | Mailander et al. | |
| 2011/0150627 A1 | * | 6/2011 | Baughman | F02C 3/064 415/1 |
| 2011/0150633 A1 | | 6/2011 | Baughman | |
| 2011/0167792 A1 | | 7/2011 | Johnson et al. | |
| 2011/0171007 A1 | * | 7/2011 | Johnson | F01D 17/162 415/145 |
| 2012/0233980 A1 | | 9/2012 | Heathco | |
| 2012/0272656 A1 | | 11/2012 | Norris | |

* cited by examiner

SHROUDLESS ADAPTIVE FAN WITH FREE TURBINE

CROSS REFERENCE TO RELATED APPLICATION

This application claims priority to U.S. Provisional Application No. 61/788,278 filed on Mar. 15, 2013.

BACKGROUND

A gas turbine engine typically includes a fan section and a core engine including compressor section, a combustor section and a turbine section. Air entering the compressor section is compressed and delivered into the combustion section where it is mixed with fuel and ignited to generate a high-energy exhaust gas flow. The energetic gas flow expands through the turbine section to drive the compressor and the fan section and finally exits through a thrusting nozzle.

Airflow through the gas turbine engine is divided between a core flow path and a bypass flow path. More flow through the bypass passage as compared to the core flow path typically provides increased fuel efficiency at the expense of overall thrust. Engines for high speed aircraft include smaller bypass to provide greater thrusts. Fuel efficiency is therefore balanced against thrust requirements and smaller bypass flows are utilized when greater thrusts are desired.

A variable cycle gas turbine engine may switch between highly fuel efficient operation with increased bypass airflow and high speed operation with less bypass flow with more thrust produced by the core engine.

Although variable cycle gas turbine engines have improved operational efficiency, turbine engine manufactures continue to seek further improvements to engine performance including improvements to propulsive efficiency.

SUMMARY

A turbine engine according to an exemplary embodiment of this disclosure, among other possible things includes turbine engine a first fan including a plurality of fan blades rotatable about an axis. A compressor in fluid communication with the first fan section. A first turbine drives the first fan section and the compressor. A second fan is disposed axially between the first fan and the compressor. A second turbine is disposed between the second fan and the compressor. The second turbine drives the second fan. A first variable guide vane is disposed axially forward of the second fan. A second variable guide vane is disposed between the second fan and the second turbine for controlling airflow through the second turbine.

In a further embodiment of the foregoing turbine engine, the second variable vane is movable between a first position for driving the second turbine at a first speed and a second position for driving the second turbine at a second speed slower than the first speed.

In a further embodiment of any of the foregoing turbine engines, the second variable guide vane is movable between a first and second positions to direct air into the second fan.

In a further embodiment of any of the foregoing turbine engines, includes a core flow path including the second turbine and leading into the compressor. A first bypass stream is defined radially outward of the core flow path and a second bypass stream is defined radially outward of the core and first bypass streams.

In a further embodiment of any of the foregoing turbine engines, no shroud is disposed proximate the second turbine.

In a further embodiment of any of the foregoing turbine engines, the second fan section directs airflow into the first bypass stream and the core flow path.

In a further embodiment of any of the foregoing turbine engines, each of the first variable vane and the second variable vane include control rods that extend radially outward through the first and second bypass streams.

In a further embodiment of any of the foregoing turbine engines, the second turbine and the second fan are attached to rotate with each other and independent of other rotating components along the axis.

A turbine engine according to an exemplary embodiment of this disclosure, among other possible things includes a first fan including a plurality of axially spaced stages rotatable about an axis. A core engine includes a compressor axially aft of the first fan. A combustor receives core flow from the compressor and a first turbine driven by gases generated in the combustor. The first turbine drives the first fan and the compressor. A core flow passage provides air to the compressor. A first bypass passage is disposed about the core engine. A second bypass passage is disposed about the first bypass. A second fan section is disposed between the first fan section and the compressor. The second fan section drives flow into one of the first bypass passage and the core flow passage. A first variable vane is disposed axially forward of the second fan section for directing airflow into the second fan section. A second turbine section is disposed between the second fan section and the compressor in the core flow passage. The second turbine section drives the second fan section. A second variable vane is disposed axially forward of the second turbine for controlling airflow through the second turbine section.

In a further embodiment of the foregoing turbine engine, the second variable vane is movable between a first position for driving the second turbine at a first speed and a second position for driving the second turbine at a second speed slower than the first speed.

In a further embodiment of any of the foregoing turbine engines, the second fan section and second turbine section are fixed to rotate together independent of the compressor and first turbine section.

In a further embodiment of any of the foregoing turbine engines, includes at least one bearing assembly supporting rotation of the second fan section and the second turbine section.

In a further embodiment of any of the foregoing turbine engines, the second variable vane is adjustable to change flow division between the first bypass passage and the core flow passage.

In a further embodiment of any of the foregoing turbine engines, no shroud is disposed proximate the second turbine section.

A method of operating a turbine engine according to an exemplary embodiment of this disclosure, among other possible things includes defining a core gas flow path through a core engine. The core engine includes a high pressure compressor, a combustor in communication with the compressor and a first turbine driven by gas flow generated by the combustor and adjusts a first variable vane forward of a second fan section and a second variable vane forward of a second turbine disposed forward of the compressor in the core gas flow path to drive the second fan section and control airflow through the second fan section and into a first bypass passage and a core flow passage.

In a further embodiment of the foregoing method, includes providing a maximum level of de-supercharging of flow into the core gas flow path at a first flight condition and providing a minimum level of de-supercharging of flow into the core gas flow path at a second flight condition.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
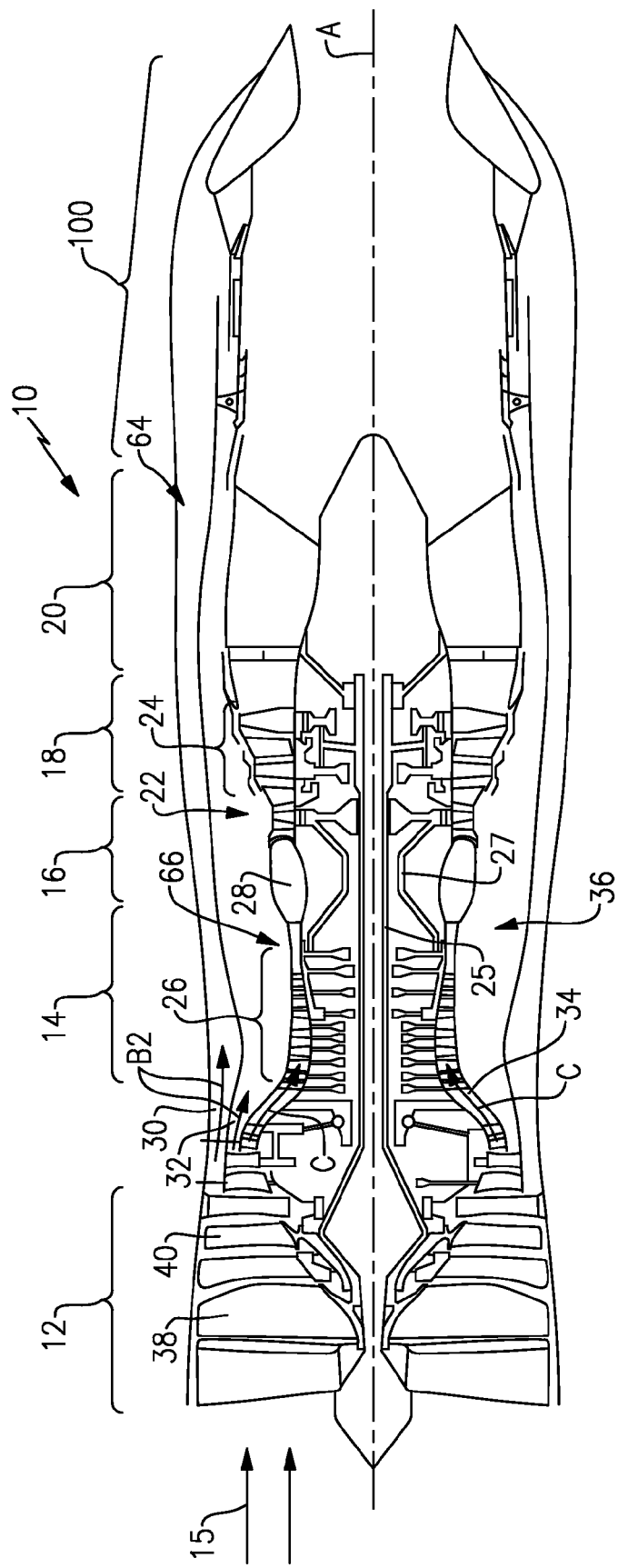
FIG. 1 is a schematic view of an example gas turbine engine.

FIG. 1 schematically illustrates an example gas turbine engine generally indicated at 10. The gas turbine engine includes a fan section 12 that communicates air to a compressor section 14. The compressed air from the compressor section 14 is provided to a combustion section 16 where it is mixed with fuel and ignited to produce a high energy gas flow. The energetic gas flow is expanded through a turbine section 18, through an augmenter section 20, and finally through an exhaust nozzle 100.

Although the disclosed non-limiting embodiment depicts a turbine engine including two spools, it should be understood that the concepts described herein are not limited to use with two spool engines and may be applied to other types of turbine engines; for example a turbine engine including a three-spool architecture.

The example gas turbine engine 10 is a mixed flow turbofan engine that includes a core flow passage 34 for core flow C through the compressor section 14, combustion section 16, and turbine section 18. Disposed annularly about the core flow path C is a first annular bypass passage 32 for a first bypass flow B1 about an engine core 36. The gas turbine engine 10 includes a second bypass passage 30 disposed radially outward of the first bypass passage 32 for a second bypass flow B2.

Figure 2:
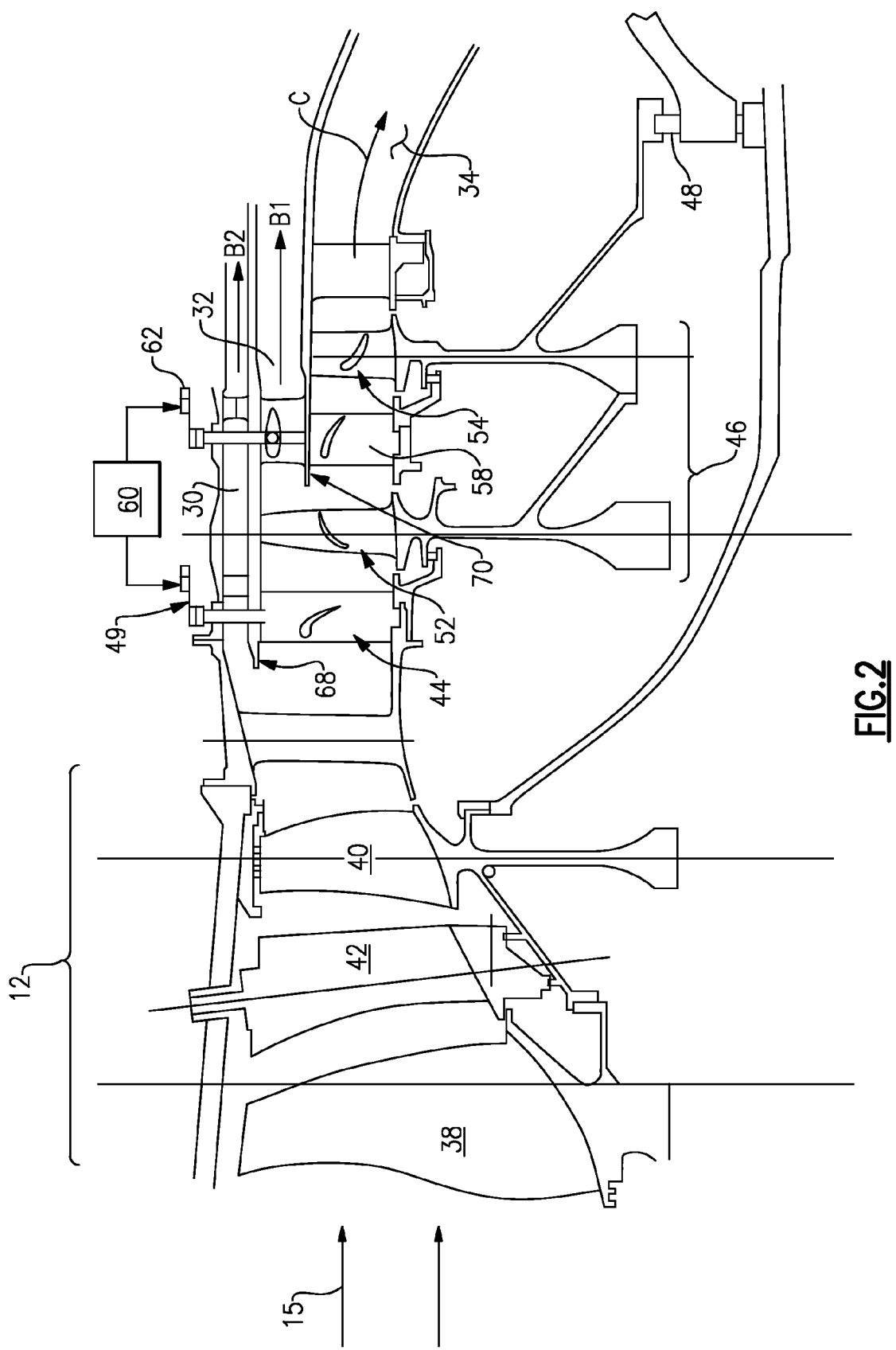
FIG. 2 is an enlarged schematic representation of a portion of the example gas turbine engine.

Referring to FIG. 2 with continued reference to FIG. 1, in operation, incoming air 15 is initially compressed by first and second fan stages 38, 40 within the fan section 12. The first fan section 12 includes a stator 42 for directing air flow 15 between fan stages 38 and 40. This initially compressed air is provided to the core engine 36 and specifically through the core flow passage 34 to compressor section 14. The compressor section 14 includes a high pressure compressor 26 where air is compressed and communicated to the combustor 28. In the combustor 28, the high pressure air is mixed with fuel and ignited to produce a high energy gas flow stream. The high energy gas flow stream is expanded through a high pressure turbine 22 and then through a low pressure turbine 24. The low pressure turbine 24 is attached to drive an inner shaft 25 that extends forward to drive the fan section 12. The high pressure turbine 22 is attached to an outer shaft 27 to drive the high pressure compressor 26.

As appreciated, although a gas turbofan engine including two separate bypass passages 30, 32 is described; other engine configurations that includes other bypass configurations and turbine configurations are also within the contemplation of this disclosure.

The example disclosed gas turbine engine 10 is utilized for flight conditions that include high Mach number flight speeds. At high Mach number flight speeds, the core engine 36 experiences an overall pressure ratio that is limited by the relationship between static pressures of the bypass flows B1 and B2 and the core flow C. The difference in static pressures limits the overall pressure ratio. Furthermore, the overall pressure ratio is limited due to temperature conditions within the high pressure compressor 26. As appreciated, increases in overall pressure ratio may result in an increase in the temperature within the compressor 26. The temperature within the compressor, specifically, the temperature of the last compressor stage generally indicated at 66 can be a limiting factor to the operation of the example gas turbine engine 10. The temperature at the last stage of the compressor 66 is maintained within acceptable parameters for all flight conditions and Mach numbers by the features of the disclosed example gas turbine engine 10.

Referring to FIG. 2, an enlarged section of a front portion of the example gas turbine engine 10 shows a third spool 46 that includes a cold turbine 54 that drives a fan section 52. A first variable vane 44 provides for direction of air to the second fan section 52. The third spool 46 de-supercharges the core airflow C into the compressor 26. De-supercharging of the core airflow C controls the temperature at the last compressor stage 66 to allow an increased and net higher overall pressure ratio of the example gas turbine engine 10 for different flight conditions and speeds.

The turbine 54 is driven by core airflow C. A second splitter 70 splits incoming airflow between the core streams C and first bypass stream B1. A first splitter 68 splits the incoming airflow 15 between the outer or second bypass passage 30 and the inner or first bypass passage 32. The second splitter 70 further splits the incoming airflow 15 into the core stream flow C and the first bypass flow B1. The second turbine 54 does not include a rotating shroud for the radially outer tip within the core flow passage 34.

Airflow B1 into the first bypass passage 32 and the core airflow C are directed and compressed by the second fan 52 that is in turn driven by the turbine 54. The fan 52 and the turbine 54 comprise the third spool 46 that rotates independent of the high pressure turbine 22 (FIG. 1) and the low pressure turbine 24 (FIG. 1) disposed in the aft portion of the gas turbine engine 10.

In the disclosed example, the third spool 46 is cantilevered forward of a bearing assembly 48 that supports rotation about the axis A. The example bearing 48 is a dual bearing enabling the cantilevered configuration to maintain rotational rigidity of the third spool 46 and balance thrust. As appreciated, other bearing configurations could be utilized and are within the contemplation of this disclosure.

The second fan section 52 is disposed forward of the second splitter 70 and directs air into the first annular bypass passage 32 and the core passage 34. A first variable vane 44 is disposed axially forward of the second fan 52 and controls airflow into the second fan section 52. The first variable vane 44 is movable between a first position 45 (FIG. 3) and a second position 47 (FIG. 3) by a controller that moves a first control arm 49.

A second variable vane 58 is disposed within the core airflow passage 34 just aft of the splitter 70 and axially forward of the second turbine 54. The second variable vane 58 is movable between a first position 72 (FIG. 3) and a second position 74 (FIG. 3) by the controller 60 that moves a second control arm 62. The first and second control arms 49, 62 extend radially outward through the first bypass passage 32 and the second bypass passage 30.

As appreciated, the first and second variable vanes 44, 58 comprises a plurality of vanes annularly disposed within the core flow passage 34. The first variable vanes 44 are movable between the first position 47 and the second position 45 to control airflow split between the first bypass passage 32 and the core flow passage 34. The second variable vanes 58 are movable between the first position 72 and the second position 74 to control a speed at which the turbine 54 rotates about the engine axis A.

Another embodiment holds fixed every other circumferential one of the first and second variable vanes 44, 58 and moves every other circumferential vane as a pattern of fixed, variable, fixed, variable, . . . , fixed, variable. The fixed vanes carry structural loads.

The alteration and adjustment of the speed of the turbine 54 and air swirl of the second fan 52 changes the condition of the core flow C into the core flow passage 34 to the high pressure compressor 26 and changes the condition of the bypass flow B1 into passage 32. The control of the core flow C provides control of the de-supercharging of air to the compressor 26 for controlling the temperature within the compressor 26. The control of the temperature further provides for operation of the gas turbine engine 10 at a higher net overall pressure ratio at low flight Mach numbers.

Control over the air swirl of the second fan 52 controls the split between bypass flow B1 and core flow C. Adjustment of the second fan 52 provides for a natural split between the bypass passage 32 and the core flow passage 34.

Figure 3:
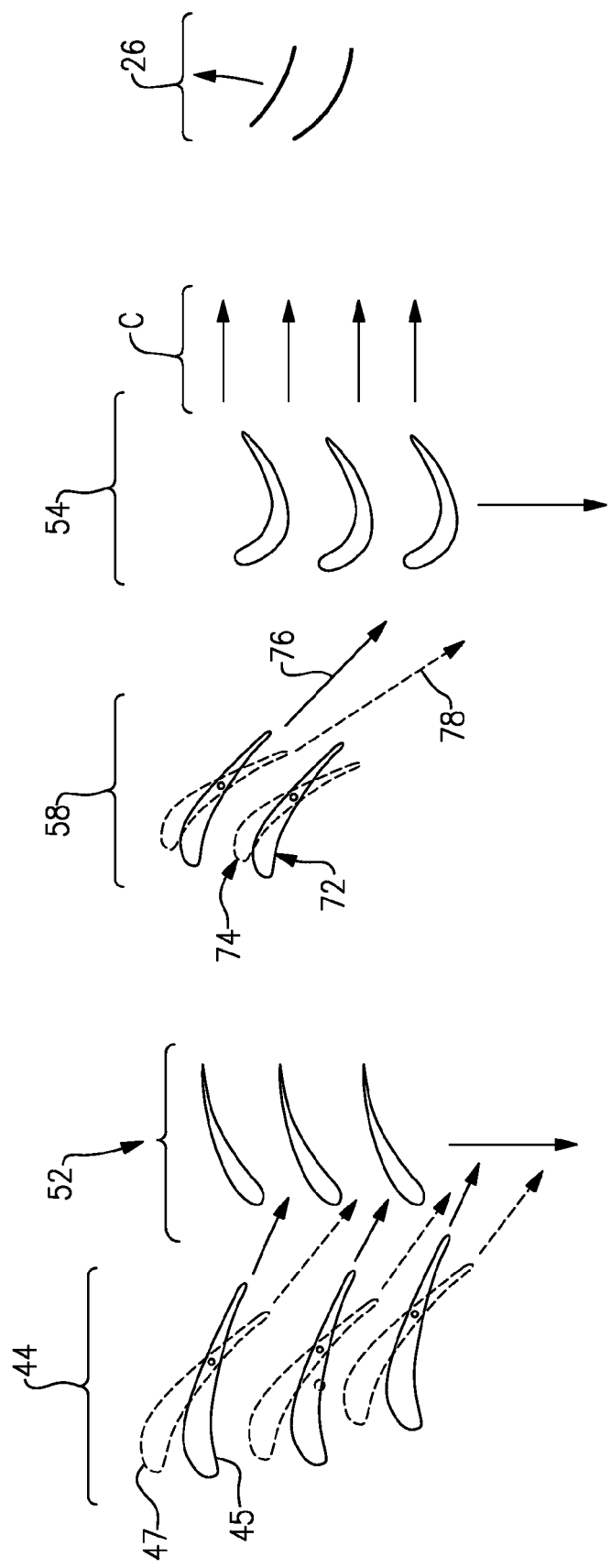
FIG. 3 is a schematic representation of a core gas flow path through the example gas turbine engine.

Referring to FIG. 3 with continued reference to FIG. 2, a first splitter 68 splits the incoming airflow 15 between the outer or second bypass passage 30 and the inner or first bypass passage 32. The second splitter 70 further splits the incoming airflow into the core stream flow C and the first bypass flow B1. Moreover, adjustment of the first variable vane 44 in combination with the second fan section 52 enables airflow to naturally split between the first bypass passage 32 and the core flow passage 34.

The airflow 15 is compressed by the first fan section 12 that is driven by the low pressure turbine 24 through the inner shaft 25. Much of the incoming airflow 15 is compressed further through the fan section 52 that is driven by the turbine 54. The first variable vane 44 controls the amount of compression by controlling how airflow enters the fan section 52. A minority fraction of the incoming airflow 15 bypasses fan section 52 as the outer bypass stream B2.

Incoming airflow 15 that is compressed by the fan section 52 is split into the core stream flow C and the first bypass flow B1. Fan section 52 pumps core stream flow C to the variable vane 58. The second variable vane 58 is movable between the first position generally indicated at 72 and the second position indicated at 74. Another embodiment holds fixed every other circumferential vane 58 and moves every other circumferential vane 58 as a pattern of fixed, variable, fixed, variable, . . . , fixed, variable. The fixed vanes 58 carry structural loads.

In the first position 72, airflow is directed to the turbine 54 in a first direction indicated by arrow 76. In the second position 74 of the variable vane 58 airflow will impact the turbine 54 in a direction indicated by arrow 78. The direction of impact of the flow determines the energy extracted from the core flow C by the turbine 54. Direction 78, also known as closing the variable vane 58, causes more energy extraction and direction 76, also known as opening the variable vane 58, extracts less energy via turbine 54.

The positions of the first variable vane 44 and the second variable vane 58 control the speed and direction of flow through the second fan section 52. Incoming airflow 15 splits between the first bypass passage 32 and core flow passage 34 depending on the speed and orientation of airflow entering the second fan section 52.

As appreciated, although first and second positions are shown by way of example, the variable vanes 58 may be moved through an infinite number of positions to provide the desired control over a speed of the turbine 54, and thereby control of the core airflow C.

A first position 45 of the first variable vanes 44 (open) and a first position 72 of the second variable inlet guide vane 58 (open) are controlled to minimize core airflow C and minimize the energy extracted from the core airflow C by the turbine 54 such that de-supercharging of the core airflow is minimized A second position 47 (closed) of the first variable vane 44 and a second position 74 (closed) of the second variable guide vane 58 are controlled to maximize core airflow C and maximize the energy extracted from the core airflow C by the turbine 54 such that de-supercharging of the core airflow is maximize.

Accordingly, the example cold turbine or third spool turbine 54 operates at variable rotational speeds as is controlled by movement of the variable vane 58. At high flight Mach numbers the magnitude of the de-supercharging of the core airflow is maximized to control the temperature within the compressor 26.

At low flight Mach numbers the amount of de-supercharging of the core airflow C is minimized to allow maximum operation of the compressor 26. The variable speed turbine 54 de-supercharges air that is proceeding into the core engine to minimize the impact of the temperature of the airflow 15 and prevent the high pressure compressor 26 from exceeding a maximum temperature. The variation of the core airflow C is independent of the bypass airflow B2 through the second bypass 30. At high flight Mach numbers, the amount of de-supercharging is maximized to provide the core airflow C at greater flow rates.

Accordingly, the example gas turbine engine includes a third turbine spool section 46 that includes a variable cold turbine 54 that drives a fan section 52. The energy of the flow entering fan section 52 is from the inlet airflow 15 itself, e.g., the ram energy due to the flight speed Mach number, and the compression by fan section 12 that is driven by turbine 24. Additional energy is imparted to the core flow C and the bypass airflow B1 by the fan section 52 driven by cold turbine 54. The flow and pressure energy into the cold turbine 54 is from the core fraction of the inlet airflow 15, the core fraction of fan section 12, and core fraction of fan section 52. The total energy of the core flow C entering turbine 54 is sufficient to drive fan section 52 entirely. Accordingly, the swirling and turning of the flow by turbine 54 is greater than the turning of the flow in fan section 52 in order to extract the energy needed to compress both core flow C and the bypass flow B1 via fan section 52 (FIG. 3).

At high flight Mach numbers and high engine thrust, controller 60 closes variable vanes 44, 58 and the cold turbine 54 extracts more energy from the core flow C to drive more energy into the bypass flow B1. At low flight Mach numbers and low engine thrust, control 60 opens vanes 44, 58 and the cold turbine 54 extracts less energy from the core flow C to drive less energy into the bypass flow B1.

At high flight Mach numbers and high engine thrust, extracting more energy from the core flow C reduces the exit temperature T3 of compressor 26 and increases the thrust of the bypass flow B1. At low flight Mach numbers and low engine thrust, extracting less energy from the core flow C increases the exit temperature T3 of compressor 26 and improves the core thermodynamic cycle efficiency and reduces the thrust of the compression of the bypass flow B1 to improve propulsive efficiency.

Although a dual annular bypass flow gas turbine engine is indicated, the features of the disclosed invention could be utilized in an engine where only a single annular bypass flow B1 is utilized. Moreover, the example third spool cold turbine 54 could also be utilized in a gas turbine engine configuration including a single fan stage. As appreciated, in this example at least two fan stages are provided prior to the third spool 46 and the fan section 52. Accordingly, the example third spool 46 and cold turbine 54 provide for the adaptation of a high performance gas turbine engine to various operational parameters while maintaining the compressor temperature within desirable temperature limits. The controller 60 and engine controller work in conjunction to control the various operational parameters while maintaining the compressor temperature within desirable temperature limits and maximizing the fuel efficiency of the engine.

Although an example embodiment has been disclosed, a worker of ordinary skill in this art would recognize that certain modifications would come within the scope of this disclosure. For that reason, the following claims should be studied to determine the scope and content of this disclosure.

The invention claimed is:

1. A turbine engine comprising:
a first fan section including a plurality of fan blades rotatable about an axis;
a compressor in fluid communication with the first fan section;
a first turbine driving the first fan section and the compressor;
a second fan section disposed axially between the first fan section and the compressor;
a second turbine disposed between the second fan section and the compressor, the second turbine driving the second fan;
a core flow path including the second turbine and leading into the compressor, a first bypass stream defined radially outward of the core flow path and a second bypass stream defined radially outward of the core and first bypass streams;
a first splitter dividing airflow into a first flow into the core flow path; and the first bypass stream and a second flow into the second bypass stream;
a second splitter aft of the first splitter dividing airflow between the first bypass stream and the core flow path, wherein the second turbine is disposed aft of the second splitter and within the core flow path;
a first variable guide vane disposed axially forward of the second fan section; and
a second variable guide vane disposed between the second fan section and the second turbine for controlling airflow through the second turbine.

2. The turbine engine as recited in claim 1 wherein the second variable vane is movable between a first position for driving the second turbine at a first speed and a second position for driving the second turbine at a second speed slower than the first speed.

3. The turbine engine as recited in claim 1, wherein the first variable guide vane is movable between a first and second positions to direct air into the second fan section.

4. The turbine engine as recited in claim 1, wherein no shroud is disposed proximate the second turbine.

5. The turbine engine as recited in claim 1, wherein the second fan section directs airflow into the first bypass stream and the core flow path.

6. The turbine engine as recited in claim 1, wherein each of the first variable vane and the second variable vane include control rods that extend radially outward through the first and second bypass streams.

7. The turbine engine as recited in claim 1, wherein the second turbine and the second fan section are attached to rotate with each other and independent of other rotating components along the axis.

8. A turbine engine comprising:
a first fan section including a plurality of axially spaced stages rotatable about an axis;
a core engine including a compressor axially aft of the first fan section, a combustor receiving core flow from the compressor and a first turbine driven by gases generated in the combustor, wherein the first turbine drives the first fan section and the compressor;
a core flow passage providing air to the compressor;
a first bypass passage disposed about the core engine;
a second bypass passage disposed about the first bypass;
a second fan section disposed between the first fan section and the compressor, the second fan section driving flow into both the first bypass passage and the core flow passage;
a first variable vane disposed axially forward of the second fan section for directing airflow into the second fan section;
a second turbine section disposed between the second fan section and the compressor in the core flow passage, the second turbine section driving the second fan section and disposed aft of a splitter dividing flow between the first bypass passage and the core flow passage; and
a second variable vane disposed axially forward of the second turbine for controlling airflow through the second turbine section.

9. The turbine engine as recited in claim 8, wherein the second variable vane is movable between a first position for driving the second turbine at a first speed and a second position for driving the second turbine at a second speed slower than the first speed.

10. The turbine engine as recited in claim 8, wherein the second fan section and second turbine section are fixed to rotate together independent of the compressor and first turbine section.

11. The turbine engine as recited in claim 10, including at least one bearing assembly supporting rotation of the second fan section and the second turbine section.

12. The turbine engine as recited in claim 8, wherein the first variable vane is adjustable to change flow division between the first bypass passage and the core flow passage.

13. The turbine engine as recited in claim 8, wherein no shroud is disposed proximate the second turbine section.

14. A method of operating a turbine engine comprising defining a core gas flow path through a core engine, where the core engine includes a first fan section, a high pressure compressor, a combustor in communication with the high pressure compressor and a first turbine driven by gas flow generated by the combustor; and
adjusting a first variable vane forward of a second fan section and a second variable vane forward of a second turbine disposed forward of the compressor in the core gas flow path to drive the second fan section such that the second fan section drives airflow into both a first bypass passage and a core flow passage, wherein the second variable vane is disposed aft of a splitter dividing flow between the core gas flow path and a first bypass passage.

15. The method as recited in claim 14, including positioning at least one of the first variable vane and the second variable vane to provide a maximum level of de-supercharging of flow into the core gas flow path at a first flight condition and positioning at least one of the first variable vane and the second variable vane to provide a minimum level of de-supercharging of flow into the core gas flow path at a second flight condition.

* * * * *